United States Patent [19]

Kolenc

[11] Patent Number: 5,131,627
[45] Date of Patent: Jul. 21, 1992

[54] DIAPHRAGM VALVE

[75] Inventor: Terrence J. Kolenc, Mentor, Ohio

[73] Assignee: Nupro Company, Willoughby, Ohio

[21] Appl. No.: 599,004

[22] Filed: Oct. 17, 1990

[51] Int. Cl.⁵ ............................................... F16K 7/17
[52] U.S. Cl. .................................... 251/331; 251/63.6;
251/365
[58] Field of Search ................ 251/331, 365, 334, 63.6

[56] References Cited

U.S. PATENT DOCUMENTS

| | | |
|---|---|---|
| 1,656,214 | 1/1928 | Masson . |
| 2,585,863 | 2/1952 | Smith . |
| 4,718,442 | 1/1988 | Nicoll ............................ 137/540 X |
| 4,867,201 | 9/1989 | Carten .............................. 251/331 X |
| 4,953,826 | 9/1990 | Ohmi et al. ........................ 251/331 |

FOREIGN PATENT DOCUMENTS 61-244976 10/1986 Japan .
63-285373 11/1988 Japan .
64-15576 1/1989 Japan .
64-26073 1/1989 Japan .

Primary Examiner—Arnold Rosenthal
Attorney, Agent, or Firm—Fay, Sharpe, Beall, Fagan, Minnich & McKee

[57] ABSTRACT

A diaphragm valve includes a single layer, metal diaphragm cooperating with a plastic valve seat. The surface area and volume of the valve seat is limited. Additionally, the central portion of the diaphragm is generally hemispherically offset and extends axially from a planar periphery. The actuating stroke of the valve is maintained less than the offset that is formed in the diaphragm. Lastly, the valve seat is secured in such a manner to insure repetitive long term shutoff under a variety of operating conditions and limit entrapment and outgassing of potential system contaminants.

8 Claims, 3 Drawing Sheets

DIAPHRAGM VALVE

BACKGROUND OF THE INVENTION

This invention pertains to the valve art and more particularly to a diaphragm valve. The invention is particularly applicable to a fluid system requiring high purity, good fluid lead integrity, low internal volume and high reliability. However, it will be appreciated that the invention has broader applications and may be advantageously employed in other environments and applications.

Certain sectors of the manufacturing industry have imposed increasingly stricter requirements on valve manufacturers, some of these standards being unthinkable only a few years ago. In addition to providing reliable open and closed positions to regulate fluid flow, the industry has become even more concerned with other characteristics of the valve, particularly cleanliness both before, during and after actuation. With more sensitive and accurate sensing equipment and the increased demand for purity in fluid systems, valve manufacturers are ever conscious of new and different arrangements that satisfy their customer's needs.

As will be appreciated, plastic has been incorporated into valve designs due to the reliable sealing, durability, adaptability, and long cycle life attainable with selected plastics in the valve environment. Unfortunately, the use of plastic has come under increased scrutiny due to its ability to entrap and outgas fluids, i.e. release of fluid to the system at an undesired time, that could contaminate the system.

In a related manner, use of plastic can also have a dramatic effect on the time required to clean or purge the system. Since the plastic can entrap fluid, longer cleaning times are necessary which results in increased down-time for the fluid system. Because of the tremendous cost to the manufacturer, decreasing down-time is always desirable and limiting the amount of plastic in the valve design is a key goal.

Other valve designs incorporate greater amounts of plastic into the valve seat: either (i) by the method of containing the seat in the valve body, or (ii) by enclosing the seat in a movable valve member. The excessive surface area and volume of the plastic used in the valve seats of these designs contributes to fluid entrapment and subsequent potential system contamination.

Many present day valves include multi-layer diaphragm constructions. This type of design has a primary drawback. That is, if one or more layers of the composite diaphragm fails, the operator may be unaware of its failure. This could cause a virtual leak between the diaphragm layers which would serve as an area for potential fluid entrapment. The fluid could be trapped between the diaphragm layers and released to the system at an undesired time.

The number of diaphragms in the valve can also cause problems. Too few layers in a multi-layer design may not adequately address pressure containment concerns. On the other hand, too many layers makes the multi-layer diaphragm assembly too stiff and potentially unable to be moved to effect valve closure. Single layer diaphragm designs can also be subject to the inadvertent assembly of more than one diaphragm without operator awareness.

Reliability of operation is always a primary concern with valves handling dangerous fluids. Under the general category of reliability, valve manufacturers have employed various arrangements to assure that the valve will open under all conditions. One arrangement is to structurally tie the actuating stem to the seat by forming an opening through a central portion of the diaphragm and directly fastening the stem and plastic valve seat together. This arrangement, where the plastic is secured to the diaphragm rather than the valve body, compromises the integrity of the diaphragm and defines yet another potential leak path that must be effectively addressed by the valve design.

An alternate arrangement secures one face of the diaphragm to the actuating stem by welding or the like. Although the integrity of the diaphragm is maintained, this alternate arrangement has detrimental aspects of its own related to the welding operation.

With some constructions it is even possible to deflect the diaphragm to a position where it can't be operated. For example, an overcenter position of the diaphragm may occur so that movement of the diaphragm from a first position toward a second position may be precluded even though the actuating stem is still operational.

Still another aspect of reliability is effective sealing or closure of the valve. A metal seal would solve the entrapment problem but creates other problems. The force required to make a seal between a metal diaphragm and a metal valve seat is substantial. This is particularly a problem when an air actuated version of the valve is desired. That is, a manual actuator can easily supply a large closing force, but the closing force of the air operated version is dictated by the pressure source available to actuate the valve and also size constraints on the actuator itself. Even then, highly polished metal seal surfaces do not have the ability to conform to different operating conditions, in contrast to valves employing the plastic seats. Thus, the (i) metal-to-metal and (ii) plastic valve seat designs are directed to entirely different structures that have their respective attributes and deficiencies.

Another major concern with the air actuated version of the valve design is reducing the actuating force, and thus the actuating pressure, required to operate the valve, i.e., move the valve member toward open and closed positions. Multiple layers as in the composite diaphragm arrangement add to the stiffness of the diaphragm. This requires increased pressure to actuate the valve. Since the source of pressure is oftentimes located at remote locations relative to the valve, it becomes necessary to increase the actuating system pressure due to the pressure loss in delivering the gas to the point of use. This, in turn, encounters unnecessary expense.

SUMMARY OF THE INVENTION

The present invention contemplates a new and improved valve that overcomes all of the above-referenced problems and others, and provides a reliable valve structure incorporating a plastic valve seat. The subject diaphragm valve operates at low pressure and simultaneously effectively addresses the fluid system requirements.

According to a more limited aspect of the invention, the diaphragm valve includes a body having inlet and outlet passages communicating with a valve chamber. A metal diaphragm is sealed along a peripheral planar edge to close the valve chamber and has a central portion that sealingly cooperates with the plastic valve seat. Both the surface area and volume of the valve seat are minimized.

According to another aspect of the invention, the diaphragm is defined by a single layer.

According to still another aspect of the invention, a generally hemispherical portion of the diaphragm extends axially outward from its planar edge a dimension greater than the stroke of the valve.

According to yet another aspect of the invention, the valve seat is received in a groove so that only a portion thereof extends into the chamber.

A principal advantage of the invention is providing a valve that satisfies fluid entrapment problems.

Yet another advantage of the invention is found in reliable opening and closing of the valve.

Another advantage of the invention is in maintaining leak integrity to the environment.

Yet another advantage of the invention is realized by the low pressure required to actuate the valve.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE PREFERRED EMBODIMENT

Figure 1:
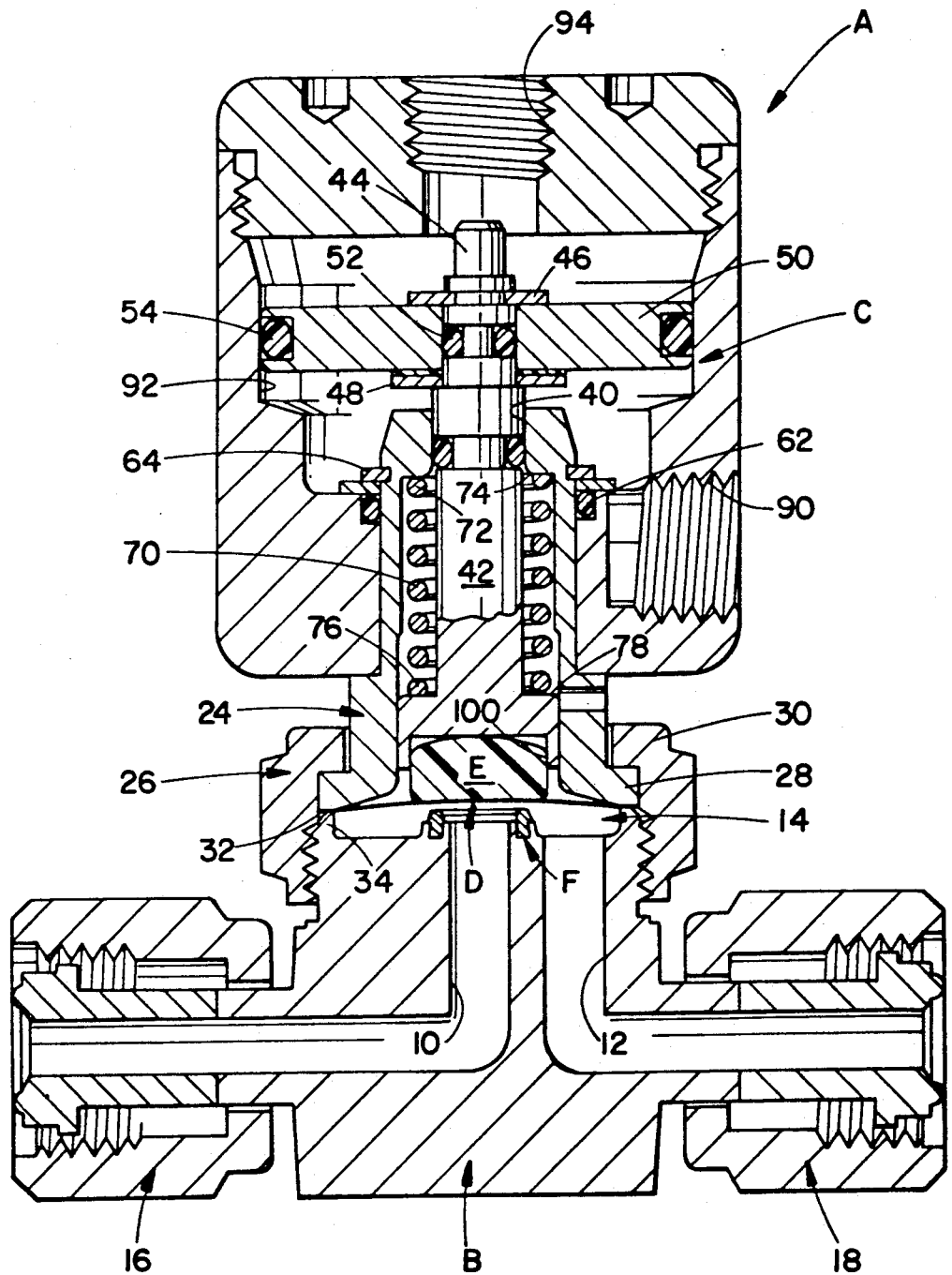
FIG. 1 is a longitudinal cross-sectional view of the subject invention.

Referring now to the drawings wherein the showings are for purposes of illustrating the preferred embodiment of the invention only and not for purposes of limiting same, the FIGS. show a diaphragm valve A having a body B, preferably of stainless steel construction, an actuating means c, a single layer, metal diaphragm D, a non-metallic or plastic button E, and plastic valve seat F.

More particularly, and with reference to FIG. 1, inlet and outlet passages 10, 12 communicate with a chamber 14 defined in the body. Each of the passages 10, 12 are connected to an external fluid system (not shown) via suitable connection means such as fittings 16, 18. Of course it will be understood that still other fittings can be used as alternatives to the illustrated arrangement.

The chamber is closed on an upper side by bonnet 24 that is axially urged toward the body by retaining nut 26. Particularly, a lower portion of the bonnet extends through the nut and a radially extending shoulder 28 on the bonnet cooperates with a radially extending shoulder 30 of the nut. Threaded regions on the body and nut cooperate to axially advance the bonnet into clamping metal-to-metal sealing contact with a planar peripheral edge 32 of the diaphragm. Thus, the peripheral edge of the diaphragm is compressed between shoulder 28 of the bonnet and a projecting, integral lip 34 of the body.

A through bore 40 of the bonnet receives a stem 42 of the actuating means C. More specifically, spaced grooves on a first or axially outer end 44 of the stem receive snap or retaining rings 46, 48, respectively, on opposite sides of actuating piston 50. The piston is sealed along a radially inner portion to the stem by a seal ring such as O-ring 52 and along a radially outer edge by O-ring 54. An upper end of the bonnet sealingly engages actuator housing 60 by means of O-ring 62, and the housing and bonnet are secured together by a snap ring 64.

Figure 3:
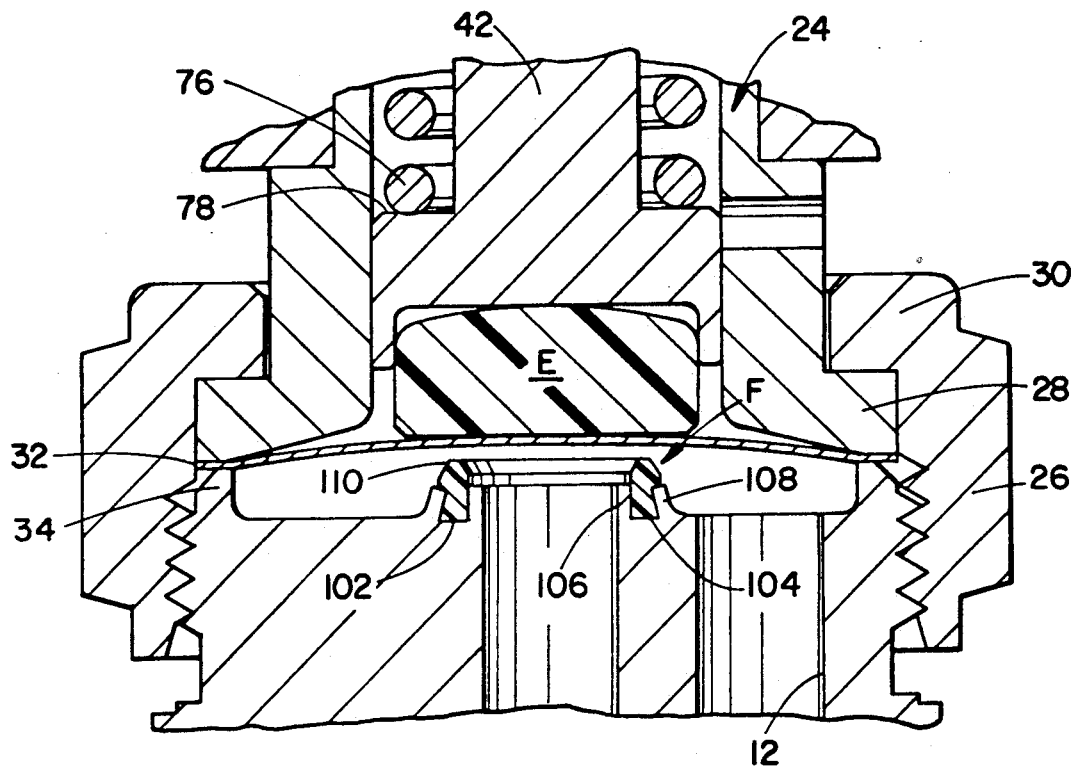
FIG. 3 is an enlarged view of the encircled region of FIG. 1 illustrating the valve in an open position; and, FIG. 4 is an enlarged detailed view similar to FIG. 3 but generally illustrating the valve in a closed position.
Figure 4:
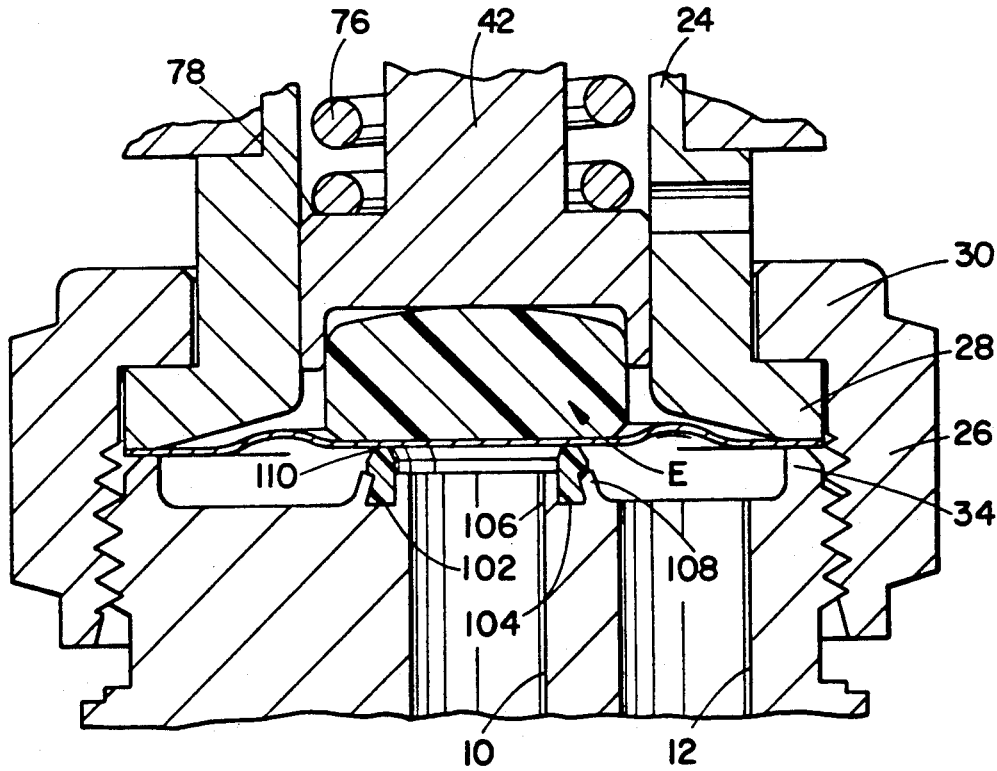

Generally concentrically received around the actuating stem 42, and entirely housed within the bonnet, is a means for biasing the actuating stem defined by spring 70. A first or upper end 72 of the spring cooperates with internal, radial shoulder 74 on the bonnet. Similarly, second or lower end 76 of the spring abuttingly engages shoulder 78 of the stem. As apparent, this arrangement continuously urges the actuating stem, and thus the diaphragm, toward a closed position (FIG. 4). Thus, FIGS. 1 and 3 are representative of pressurized fluid entering through actuator inlet 90 to pressurize the actuating chamber 92, the underside of piston 50, and overcome the spring biasing force thereby opening communication between the inlet and outlet passages 10, 12. It will also be noted that an opening 94 is provided through the actuator housing on the opposite side of the piston to permit venting.

Figure 2:
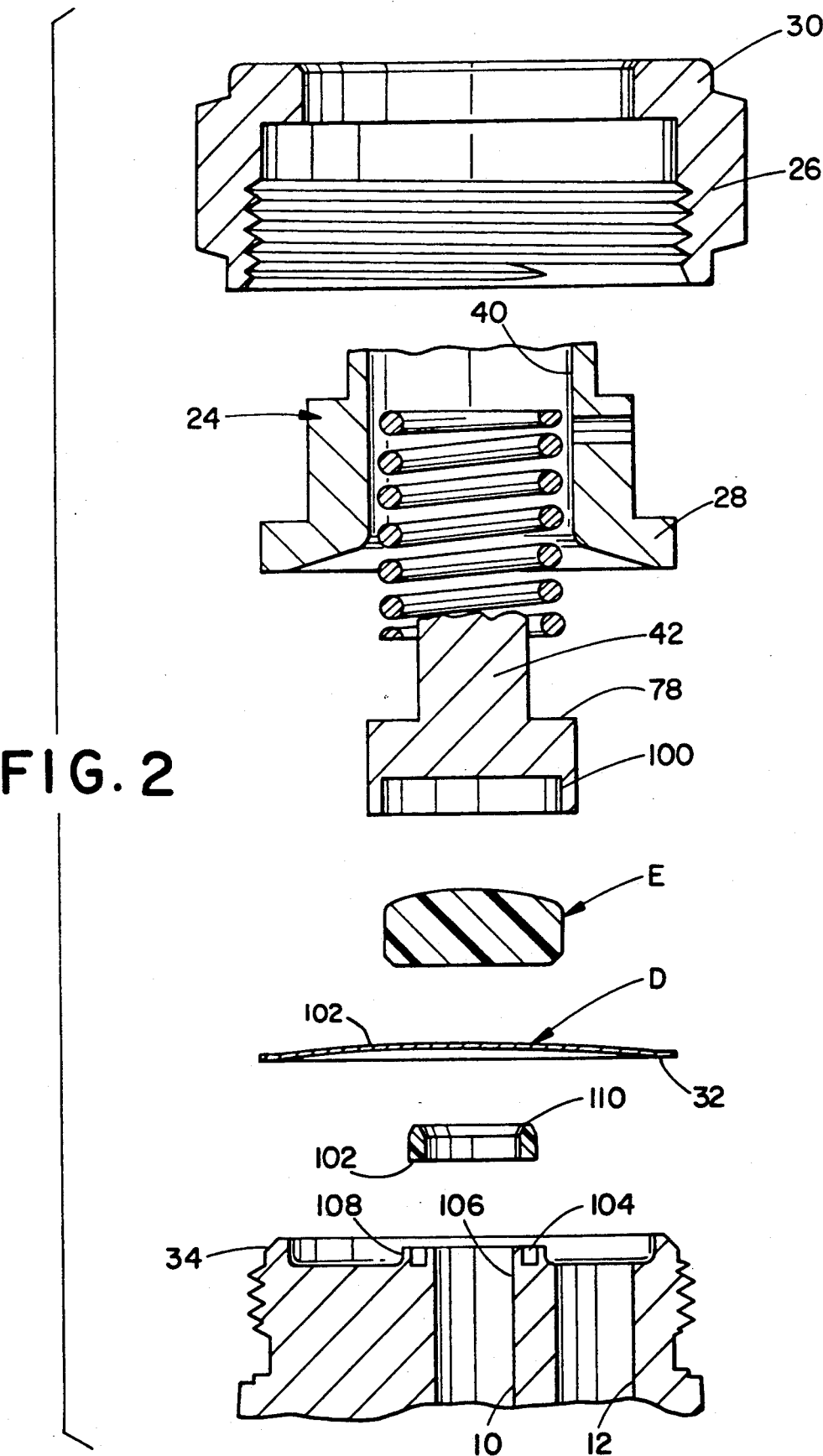
FIG. 2 is an enlarged, exploded view of the encircled region of FIG. 1.

With additional reference to FIGS. 2-4, use of a resinous material or plastic button E is intended to limit galling or wear on the upper face of the diaphragm. By way of example only, one preferred material is TORLON, a registered trademark of Amoco Chemicals Corporation. The button is freely received in a recess 100 at the lower end of the actuating stem. Additionally, the button is not secured to the diaphragm, but merely abuttingly engages the upper face thereof.

As clearly illustrated in FIG. 2, the diaphragm has a predetermined conformation that includes a planar peripheral edge 32 and a generally hemispherical central portion 102 that extends outward from the planar edge a predetermined axial dimension. It is important that the closing stroke, i.e., the extent of axial movement of the actuating stem, be less than the axial dimension of the diaphragm. Otherwise, the central portion of the diaphragm may deflect to an inverted position where it would extend axially from the planar edge toward the valve seat F. If such a condition occurred, there would be no manner of opening the valve due to the abutting engagement between the stem, button, and diaphragm. But in accordance with the dimensional relationships of the subject invention, the integrity of the diaphragm is retained and the valve operates in a reliable manner.

The valve seat, as indicated above, is constructed from a plastic material. One preferred material of construction is KELF, a registered trademark of E.I. DuPont de Nemours. This material is desirable because of its compatibility with a wide variety of system fluids, its low permeability, strength, and a minimized tendency to entrap or absorb fluids in comparison to many other conventional materials. Of course still other materials incorporating some of these desired qualities may be used without departing from the scope and intent of the subject invention.

The valve seat has a generally annular configuration in which a first or lower end 102 is received in a groove 104, preferably concentric with the inlet passage, where it merges with the chamber. It is important that the internal wall 106 of the groove covers a substantial portion of the seat ring to limit exposure of the plastic to the system fluid. Likewise, the external wall 108 substantially covers the valve seat to limit exposure to the system fluid. In this manner, the surface area exposed to system fluid is substantially reduced and fluid entrapment therein is substantially limited.

As is also apparent from the drawings, the external wall 108 is deformed or crimped radially inward to hold the valve seat in place. It is preferable that the external wall be deformed, rather than the internal wall, so that the valve seat is placed under compressive forces rather than tensile forces. Imposing tensile forces on the plastic material forming the valve seat opens the pores in the material and aids in entrapment of fluid. On the other hand, if the valve seat is compressed, the pores decrease in size rather than increase, and entrapment becomes less of a problem.

A second end 110 of the valve seat extends axially outward from the terminal ends of the internal and external walls. It is adapted for selective engagement with the bottom face of the diaphragm, i.e., opposite from the button E. The metal diaphragm cooperates with the plastic valve seat to provide an effective seal.

Use of a single layer metal diaphragm is also advantageous from the standpoint that the air operated valve is designed to actuate at approximately 40 psi. If more than one diaphragm is inadvertently assembled into the valve, which could occur because of the thin nature of the diaphragm, the subject arrangement will not overcome the stiffness of the multi-layer assembly. It is then readily apparent in routine testing procedures that more than one diaphragm is present and the potential problem easily rectified before shipment to a customer.

The combination of a single layer and low actuating pressure is also beneficial when compared to a multi-layer arrangement that requires greater pressure. Lower overall actuating pressure at the source, that already factors in the expected pressure drop from the fluid source to the end use, is always more desirable.

Further, use of a single layer diaphragm eliminates any concern with virtual leaks. As previously discussed, one of the layers of the multi-layer diaphragm assemblies could fail and the remaining layers continue to function. Unfortunately, the failed layer of the diaphragm creates a dead space in which fluid can become entrapped. Obviously concerns with purity and entrapment make this undesirable.

The failure of one of the layers in a multi-layer design causes concern from another aspect. That is, the remaining layers may not be designed to handle maximum system pressure. Thus, even though a pressure regulator is typically disposed downstream of the supply fluid cylinder and upstream of the diaphragm valve, a false sense of security is created. If the diaphragm is exposed to maximum supply pressure, and one of the layers has failed, the diaphragm may not be able to handle the pressure.

The invention has been described with reference to the preferred embodiment. Obviously, modifications and alterations will occur to others upon a reading and understanding of the specification. It is intended to include all such modifications and alterations insofar as they come within the scope of the appended claims or the equivalents thereof.

Having thus described the invention, it is now claimed:

1. A diaphragm valve comprising:
   a body having a chamber, and inlet and outlet passages communicating therewith;
   a groove defined by radially spaced inner and outer walls, the groove facing the chamber;
   a plastic valve seat partially received in the groove and only the outer wall being deformed radially inward to secure the valve seat, place it under compressive forces and limit the potential for fluid entrapment therein;
   a metal diaphragm secured to the body along a peripheral portion and having a central portion that selectively, sealingly engages the valve seat to regulate fluid communication between the inlet and outlet passages;
   a non-metallic button abuttingly engaging a face of the diaphragm opposite from the valve seat; and,
   means for actuating the diaphragm to one of open and closed positions.

2. The diaphragm valve as defined in claim 1 wherein the groove is concentric with and radially spaced from one of the inlet and outlet passages, the groove receiving the first axial end portion of the valve seat therein.

3. The diaphragm valve as defined in claim 1 further comprising a bonnet secured to the body and clampingly engaging the diaphragm therebetween.

4. The diaphragm valve as defined in claim 1 wherein the diaphragm has a generally planar edge extending radially inward a minor dimension and the central portion has a generally hemispherical configuration that extends axially a predetermined dimension from the planar edge, the closing stroke of the valve being less than said predetermined dimension.

5. The diaphragm valve as defined in claim 1 wherein the diaphragm is a single layer.

6. The diaphragm valve as defined in claim 4 further comprising a bonnet that closes the chamber and compresses the diaphragm along the peripheral portion to the body.

7. The diaphragm valve as defined in claim 4 wherein the valve seat is a plastic material having a first end received in the groove concentrically spaced around one of the inlet and outlet passages, and a second end extending into the chamber for selective sealing engagement with the diaphragm central portion.

8. A diaphragm valve comprising:
   a body having inlet and outlet passages that communicate with a chamber;
   a single layer, metal diaphragm sealed along a peripheral portion to the body to close off the chamber, and having a generally hemispherical central portion that extends axially from the peripheral portion a first dimension;
   a valve seat disposed on one side of the diaphragm and adapted for selective sealing engagement therewith;
   a groove defined in the body by radially spaced inner and outer walls, only the outer wall being deformed radially inward to retain a first end of the valve seat and the second end of the valve seat extending axially toward the diaphragm;
   a plastic button abuttingly engaging the central portion of the diaphragm on a face opposite that of the valve seat; and,
   means for actuating the diaphragm toward one of open and closed positions, the actuating means having a stroke less than the first dimension so that the diaphragm returns toward the other of the open and closed positions of its own accord.

* * * * *